Figure 1:
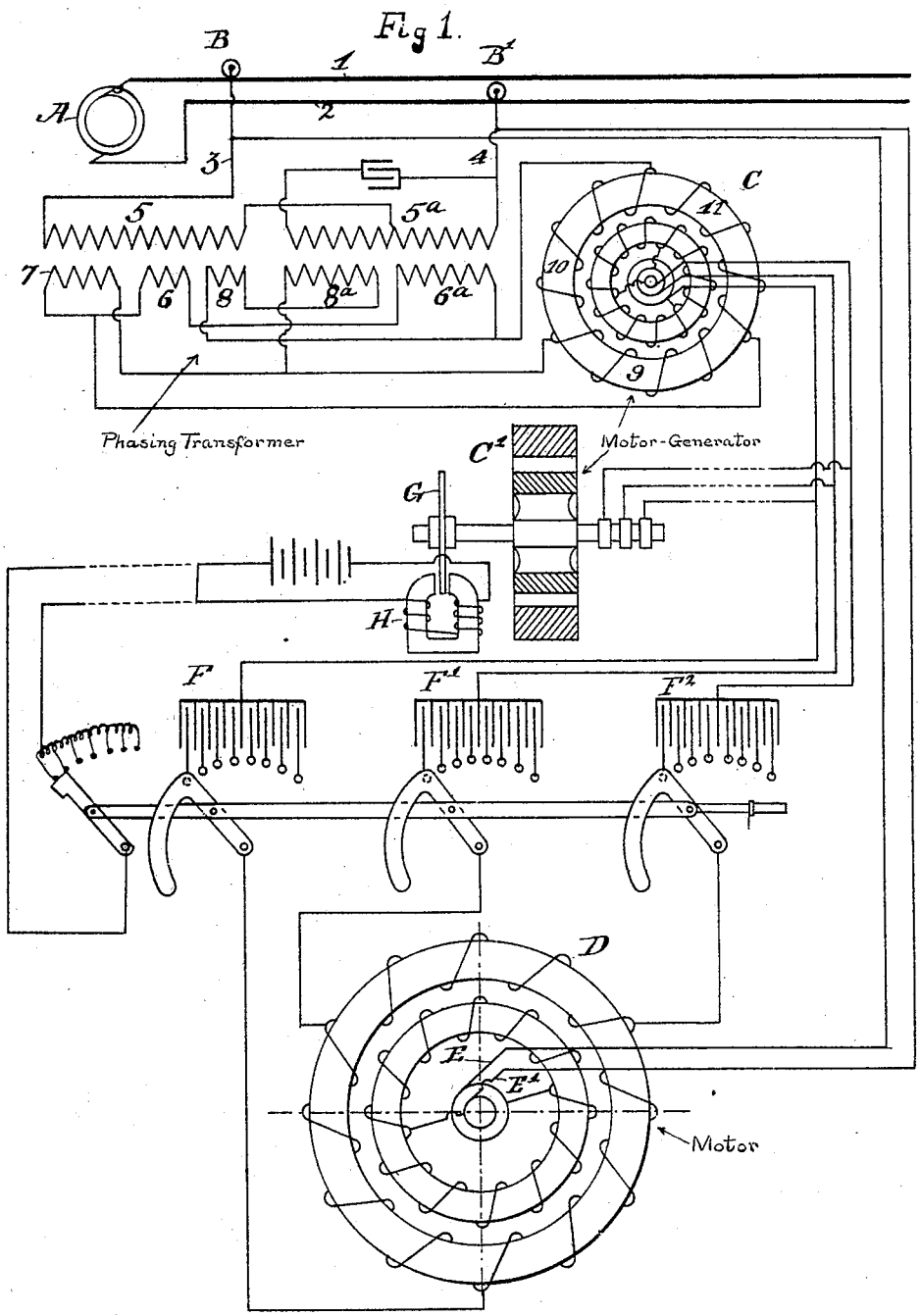

No. 614,076. Patented Nov. 15, 1898.
C. S. BRADLEY.
ALTERNATING CURRENT MOTOR AND MODE OF OPERATING SAME.
(Application filed June 22, 1896.)
(No Model.) 2 Sheets—Sheet 1.

WITNESSES:

INVENTOR
Charles S. Bradley
BY
his ATTORNEY.

No. 614,076. Patented Nov. 15, 1898.
C. S. BRADLEY.
ALTERNATING CURRENT MOTOR AND MODE OF OPERATING SAME.
(Application filed June 22, 1896.)
(No Model.) 2 Sheets—Sheet 2.

UNITED STATES PATENT OFFICE.

CHARLES S. BRADLEY, OF AVON, NEW YORK, ASSIGNOR TO THE GENERAL ELECTRIC COMPANY, OF NEW YORK.

ALTERNATING-CURRENT MOTOR AND MODE OF OPERATING SAME.

SPECIFICATION forming part of Letters Patent No. 614,076, dated November 15, 1898.

Application filed June 22, 1896. Serial No. 596,422. (No model.)

*To all whom it may concern:*

Be it known that I, CHARLES S. BRADLEY, a citizen of the United States, and a resident of Avon, in the county of Livingston and State of New York, have invented certain new and useful Improvements in Alternating-Current Motors and Modes of Operating the Same, of which the following is a specification.

This invention relates to transmission of power by alternating currents, the object being to transmit energy by means of single-phase alternating currents and economically utilize it for the operation of electric motors.

The invention is especially applicable to railroad-service where the motor is connected with the supply-conductors by means of a traveling contact or contacts. I provide at the point where the electrical energy is to be converted into mechanical motion an alternating-current motor one element of which is charged with single-phase currents from the supply-conductors, and in the other element I create a rotary magnetic field the magnetizing-current of which is supplied through a phasing-transformer which converts the single-phase line-currents into polyphase currents. I interpose a polyphase-induction motor-generator between the phasing-transformer and the rotary field-winding of the principal motor, the motor-generator having a rotary magnetic field set up in one element by the phasing-transformer and having its secondary circuit connected to charge the rotary magnetic field of the principal motor. I increase the flow of current in the circuit supplied by the armature of the motor-generator, including the polyphase winding of the motor, by rendering it consonous or approximately resonant by the introduction of condensers. The generator is provided with a retarding device for varying its load and the rate of alternation of the magnetizing-circuit of the motor.

The invention comprises a method of converting electrical energy into mechanical motion by converting a monophase or single-phase current into polyphase currents, charging a rotary magnetic field therewith, and charging a motor element within said field with the single-phase currents.

The invention also comprises a motor system involving a phasing device for converting single-phase into polyphase currents, a rotary magnetic field charged thereby, and a motor element within said field charged by the single-phase current.

The several features of novelty of my invention will be particularly hereinafter described and will be definitely indicated in the claims appended to this specification.

Figure 2:
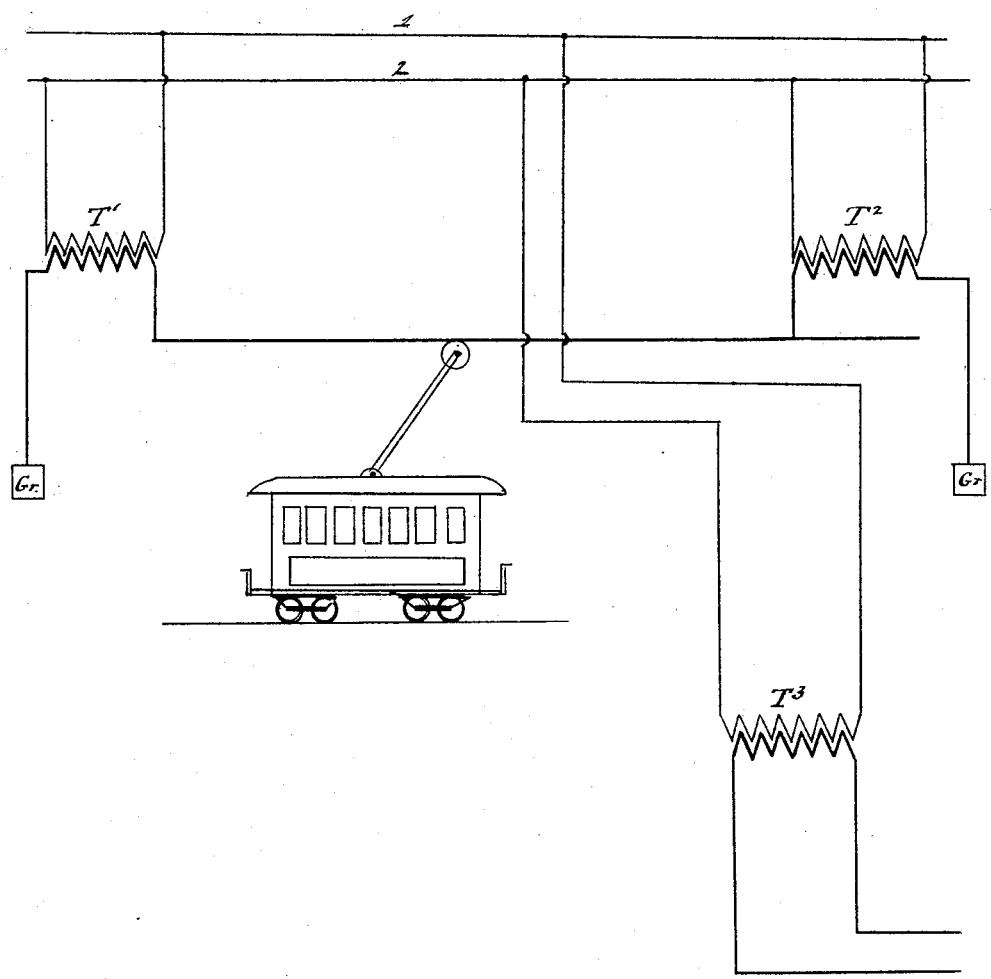

In the accompanying drawings, Figure 1 shows, diagrammatically, a system embodying my improvements. Fig. 2 represents a modified system.

A is a generator of single-phase alternating currents, and 1 2 a pair of supply-wires connected therewith.

B B' represent a pair of trolleys constituting a movable connection with the supply-wires and leading to a traveling vehicle containing the apparatus illustrated in the diagram. The trolleys lead to a phasing-transformer by conductors 3 4. This phasing-transformer is of a type described in a patent granted to me September 24, 1895, No. 546,756, by which a single-phase current is transformed into polyphase currents.

The device is diagrammatically shown in the drawings. For a detailed description reference may be had to my patent above noted and to the transactions of the American Institute of Electrical Engineers for 1895.

5 $5^a$ represent, respectively, the simple and compound coils, in which a difference of phase of ninety degrees, or thereabout, is produced by connecting one terminal of the simple coil with the middle point of the compound coil and leading one terminal of the latter directly and the other terminal through a suitble condenser. By suitably combining the coils in inductive relation to the simple and compound coils and inverting the phases by reversing the coil connections when necessary any desired phase displacement may be produced in the secondary circuits of the transformer. For example, the coils 6 $6^a$, inductively related, respectively, to the simple and compound coils, may be combined in suitable proportions to shift the phase of resulting current one hundred and twenty degrees from coil 7, in inductive relation only to the simple coil, for twice as many turns of a coil displaced ninety degrees would bring the resultant phase closer to that phase. Similarly coils 8 and 8ª may be combined, one being reversed, thereby shifting its phase one hundred and eighty degrees. Let us suppose that coil 6 is provided with three turns and coil 6ª with six turns. The phase of resultant current in the circuit including the two will be closer to that of the compound coil 5ª. The phase of current in coil 10 of the rotary field-winding of generator C will therefore be two-thirds of ninety degrees, or sixty degrees, from coil 9; but the phases of magnetomotive force will be one hundred and twenty degrees apart by reason of the reverse connections of the two coil systems with relation to the coils 9 and 11 of the rotary field-winding. Similarly coil 11 may be made one hundred and twenty degrees in advance of 9. Thus triphase currents one hundred and twenty degrees apart are set up and a rotary magnetic field will be established in C. The secondary element of C may be a closed-coil winding tapped at three symmetrical points, as shown, and connected with a rotary field-winding in the motor D. In the several connecting-wires are interposed devices (shown as condensers) for varying the capacity-inductance product of the circuit which includes the two windings, and thus varying the flow of current. Devices of this character have been described in a patent issued to me April 7, 1896, No. 557,957, for a consonous alternating-current motor. The other element of the motor D is provided with two ring-contacts connecting with brushes E E' in parallel relation with the phasing-transformer to the leading-in wires 3 4. The condensers F F' F² are provided with regulating-switches to vary their adjustment. The induction-generator C is shown in sectional side elevation at C'. As seen here, one end of the armature-shaft is provided with a conducting-disk G, entering the field of a direct-charged electromagnet H, in the charging-circuit of which is included a switch and variable resistance to provide a variable load for the motor-generator C. Thus it will be seen that the whole duty of the phasing-transformer and motor-generator is to develop triphase magnetizing-currents to create a rotary field in motor D.

The controlling-switches for varying the adjustment of the condensers may be operated simultaneously with the resistance which graduates the load of the motor-generator, since a change of the resistance alters the load of said generator and changes its speed, thus producing a different rate of alternation in the magnetizing-current supplied to the field-magnet of D by the motor-generator, and therefore requires a different condenser capacity to produce electrical consonance.

In starting up the motor the switch controlling the condensers is adjusted to a position as indicated in the drawings, in which the smallest capacity is included in the circuits which supply the rotary field-winding of the motor D. The switch which graduates the retardation of the motor-generator C is adjusted for a position of minimum resistance. Thus the motor-generator C will have a low speed and there will be a maximum difference between the speed of its rotary field established by the phasing-transformer and its revolving element. Therefore currents of high frequency will be supplied to the rotary field of the motor D, such frequency being a small percentage lower than that of the supply-current. In the revolving element of the motor D are established alternating poles of the same frequency as the supply-current. Thus the rotary field-poles, being slightly retarded in position with relation to those of the revolving element of motor D, will produce a torque on said element, and as the revolving element rises in speed its torque would decrease if the speed of the rotary field remained the same; but if the speed of said rotary field be reduced such torque may be preserved. This result may be effected by adjusting the condensers so as to increase the capacity and simultaneously decreasing the load of the motor-generator C by cutting in resistance at the switch. Then the motor-generator assumes a higher speed, approximating more closely to the speed of its rotary field, which is synchronous with the supply-current, thereby furnishing to the consonous circuits a lower rate of alternation, and this graduation may be carried on to any extent desired within the speed limits of the motor D, which, of course, never can exceed the rate of alternation of the supply-circuit.

While I have shown herein a lagging device for controlling the speed of the motor-generator, such device is not in all cases absolutely necessary, as the condenser adjustment will by its reaction and consonous relations control the speed of the motor-generator and thereby the speed of the main motor D.

The motor-generator may be quite small in size relatively to the motor D, since the consonous condition of the magnetizing-circuits eliminates the opposing effect of inductance and permits a comparatively small current to produce a large magnetizing effect.

In operation the phasing-transformer fed by the single-phase line-currents establishes polyphase currents, which set up a rotary field in the motor-generator, and triphase secondary currents are thus established in the circuit which supplies the stationary element of the motor D; but the rate of alternation of the secondary currents may be made anything desired by adjusting the condensers, as hereinbefore explained. Thus a slowly-moving rotary magnetic field or a rapidly-moving one may be set up in D, which develops torque on the revolving member of D, in which poles are established, fixed with relation to the core, by the single-phase magnetizing-current which directly supplies it.

Fig. 2 shows a modification in which tension-reducing transformers T' T² are employed at intervals, their primary windings being connected with the single-phase supply-circuit and their secondary windings being connected with a feed-wire and ground, thus permitting a car to be supplied by a single trolley. For stationary plants a transformer T³, having its primary connected with line by fixed connections, may be employed.

Having thus described my invention, what I claim as new, and desire to secure by Letters Patent, is—

1. The method of converting electrical energy into mechanical motion consisting in converting a single-phase alternating current into polyphase currents, varying the rate of said currents, charging a rotary magnetic field therewith, and charging a coöperating independently-movable motor element within said field with the single-phase currents.

2. The method of converting electrical energy into mechanical motion consisting in converting a single-phase alternating current into polyphase currents, charging a rotary magnetic field therewith, neutralizing the inductance by a suitable capacity, and charging the coöperating motor element within said field with the single-phase current.

3. The method of varying the speed of an alternating-current motor, consisting in supplying one of its elements with a single-phase alternating current, supplying polyphase currents to create a rotary magnetic field in the coöperating element, and varying the capacity-inductance product of the polyphase circuits and its rate of alternation.

4. An alternating-current motor having one element provided with a single-phase winding, and on its coöperating element a rotary field-winding, in combination with a phasing-transformer having a primary winding containing two coils connected with phase-changing devices adapted for connection with a single-phase supply-circuit, and a secondary polyphase winding for supplying the rotary field.

5. An alternating-current motor having on one element a single-phase winding, a rotary field-winding on its coöperating element, a phasing-transformer for supplying the latter with polyphase currents from a single-phase circuit, and condensers in the polyphase circuits.

6. An alternating-current motor having on one element a single-phase winding, a rotary field-winding on its coöperating element, a phasing-transformer for supplying the latter with polyphase currents from a single-phase circuit, and adjustable condensers in the polyphase circuits.

7. An alternating-current motor having a single-phase winding on one element, a rotary field-winding on its coöperating element, means for charging the two elements with single-phase and polyphase currents, respectively, and means for varying the capacity-inductance product of the polyphase circuits to render them consonous.

8. An alternating-current motor having a winding on one element connected with a single-phase supply-circuit, a polyphase winding on its coöperating element, and an independent motor-generator supplying the latter with polyphase currents.

9. An alternating-current motor having a winding on one element connected with a single-phase supply-circuit, a polyphase winding on its coöperating element, and a variable-speed generator supplying the latter with polyphase currents of variable rates.

10. The combination of an alternating-current motor having on one of its elements a rotary field-winding, with a phasing-transformer for converting single-phase into polyphase currents, and a motor-generator driven thereby, the armature of said generator connecting with the rotary field-winding of the motor at a plurality of points to set up a rotary magnetic field therein, and a single-phase winding on its other element connected with a source of single-phase currents.

11. The combination of an alternating-current motor having on one of its elements a rotary field-winding, a phasing-transformer for converting single-phase into polyphase currents, a motor-generator driven thereby, the armature of said generator connecting with the rotary field-winding at a plurality of points to set up polyphase currents therein, a single-phase winding on the coöperating element supplied by a source of single-phase currents, and means for varying the slip of the generator-armature.

In testimony whereof I have hereunto subscribed my name this 23d day of May, A. D. 1896.

CHARLES S. BRADLEY.

Witnesses:
C. R. WATERBURY,
ROBT. H. READ.